US 6,602,568 B2

(12) United States Patent
Semersky

(10) Patent No.: US 6,602,568 B2
(45) Date of Patent: *Aug. 5, 2003

(54) CO-LAYER PREFORM HAVING AN INFRARED ENERGY ABSORBING MATERIAL ADDED TO THE INNER LAYER TO EFFECT PREFERENTIAL HEATING

(75) Inventor: Frank E. Semersky, Toledo, OH (US)

(73) Assignee: Plastic Technologies, Inc., Holland, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/871,918

(22) Filed: Jun. 1, 2001

(65) Prior Publication Data

US 2002/0022140 A1 Feb. 21, 2002

Related U.S. Application Data

(62) Division of application No. 09/264,404, filed on Mar. 8, 1999, now Pat. No. 6,261,656.

(51) Int. Cl.$^7$ .............. B32B 1/08; B32B 27/08; B32B 27/18; B32B 27/30; B32B 27/36
(52) U.S. Cl. .............. 428/36.91; 428/411.1; 428/412; 428/474.4; 428/480; 428/500; 428/522; 428/523; 428/542.8; 215/12.1; 215/12.2
(58) Field of Search .............. 428/36.91, 411.1, 428/412, 474.4, 480, 500, 522, 523, 542.8; 215/12.1, 12.2

(56) References Cited

U.S. PATENT DOCUMENTS

| 4,408,004 | A | * | 10/1983 | Pengilly | 524/398 |
| 4,476,272 | A | * | 10/1984 | Pengilly | 524/398 |
| 4,535,118 | A | * | 8/1985 | Pengilly | 524/398 |
| 4,618,386 | A | * | 10/1986 | Yatsu et al. | 156/242 |
| 5,759,653 | A | * | 6/1998 | Collette et al. | 215/12.1 |
| 5,925,710 | A | * | 7/1999 | Wu et al. | 524/495 |
| 6,034,167 | A | * | 3/2000 | Tung et al. | 524/496 |
| 6,197,851 | B1 | * | 3/2001 | Maxwell et al. | 524/88 |
| 6,261,656 | B1 | * | 7/2001 | Semersky | 215/12.1 |
| H2018 | H | * | 4/2002 | Giaimo et al. | 428/35.7 |

OTHER PUBLICATIONS

Streitwieser et al., Introduction to Organic Chemistry, 4th Ed., (1995), Section 17.10, pp. 471–473.*

* cited by examiner

*Primary Examiner*—Vivian Chen
(74) *Attorney, Agent, or Firm*—Donald R. Fraser

(57) ABSTRACT

A co-layer stretch blow molding preform comprises an outer plastic preform and an inner plastic preform, wherein the inner plastic preform includes an infrared energy absorbing material which is absent from the outer plastic preform.

7 Claims, No Drawings

CO-LAYER PREFORM HAVING AN INFRARED ENERGY ABSORBING MATERIAL ADDED TO THE INNER LAYER TO EFFECT PREFERENTIAL HEATING

This Patent Application is a Divisional of U.S. patent application Ser. No. 09/264,404 filed Mar. 8, 1999 U.S. Pat. No. 6,261,656.

BACKGROUND OF THE INVENTION

This invention relates generally to a co-layer preform. More specifically, the invention is directed to the addition of an infrared energy absorbing material to the inner preform layer, to effect preferential heating of the inner layer when exposing the co-layer preform to infrared energy.

DESCRIPTION OF THE PRIOR ART

Co-layer preforms, i.e., preforms made by injecting an outer preform over a previously injection molded inner layer, suffer much the same heating restrictions and complications as do monolayer preforms.

In a monolayer preform, the innermost surface of the preform stretches much farther than the outermost surface. To properly effect this differential stretching it is beneficial if the inner layer is hotter.

In a co-layer preform, it would be desirable to heat the inner preform to a higher temperature than the outer preform. Thus, the inner preform could properly stretch at a rate consistent with that of the outer preform upon formation of the co-layer container.

SUMMARY OF THE INVENTION

Accordant with the present invention, there has surprisingly been discovered a co-layer stretch blow molding preform. The preform comprises:

an outer plastic preform; and an inner plastic preform, said inner plastic preform including an infrared energy absorbing material which is absent from the outer plastic preform.

The co-layer stretch blow molding preform according to the present invention is particularly useful for manufacturing co-layered plastic containers.

DETAILED DESCRIPTION OF THE PREFERRED EMBODIMENT

The present invention is directed to a co-layer stretch blow molding preform, comprising an outer plastic preform and an inner plastic preform, said inner plastic preform containing an infrared energy absorbing material which is absent from the outer plastic preform.

According to the present invention, the inner layer of the co-layer preform includes an additive which increases the infrared energy absorption of the inner plastic preform vis-a-vis the outer plastic preform. Thus, when the co-layer preform is heated by exposure to infrared energy, the inner preform will be heated to a higher temperature than the outer preform.

The inner and outer plastic preforms may be made from well-known plastic materials by conventional co-layer preform manufacturing technology. A particularly useful plastic material for practicing the present invention is polyethylene terephthalate (PET).

A preferred preform manufacturing process uses a PET material having a high inherent viscosity (i.e., 0.95 and higher). Such a material has an areal stretch ratio less than that of PET conventionally used for blow molding (i.e., about 0.72 to about 0.80).

If conventional infrared heating methods were used to heat the inner and outer preforms of a co-layer preform, the inner preform would only be heated to a temperature equal to or less than the temperature of the outer preform. The inner preform, which must stretch more than the outer preform, would resist proper formation of the desired co-layered container.

The present invention calls for the inclusion of an infrared absorbing material in the plastic used for the inner preform, and specifies that the infrared absorbing material is substantially absent (i.e., completely absent, or present in an insignificant quantity) from the outer preform. The infrared absorbing material may be mixed with the plastic stock in any conventional manner such as, for example, by extrusion mixing, and thereby will be distributed throughout the matrix of the inner preform during the blow molding process.

Thus, the inner preform, which is required to stretch more than the outer preform upon formation of the ultimate blow molded container, will be heated to a higher temperature than the outer preform upon exposure of the co-layer preform to infrared energy. Accordingly, the inner preform will be induced to stretch farther during the stretch blow molding operation, because of its higher temperature.

As contemplated by the present invention, the inner preform may be made from a different plastic material than the outer preform. For example, polyethylene naphthalate (PEN), which is an analog of PET but which has greater heat resistance and barrier properties and is thus an excellent candidate for container manufacturing (especially for bottles to be filled hot or treated by pasteurization after filling cold) can be utilized to produce the inner preform of the co-layer preform. PEN must be heated to a higher temperature than PET in order to be blow molded. As an inner preform in a co-layer preform, the PEN must be raised to a temperature sufficiently higher than, for example, an outer PET preform, such that the PET outer preform is caused to crystallize before the PEN inner preform is sufficiently hot to blow mold. With the addition of an infrared absorbing material to the PEN inner preform, it can be heated to a temperature hotter than that of the PET outer preform, and a container can be blow molded from the co-layer preform which utilizes the teachings of this invention.

Suitable plastics for preparing the inner and outer preforms according to the present invention include, but are not necessarily limited to, PET, PEN, polystyrene, polyacrylates, polymethacrylates, polyvinyl chloride, polyacrylonitrile, polyvinyl acetate, polyvinyl alcohol, polyolefins, polyesters, polycarbonates, polyethers, polyamides, and the like, as well as derivatives, blends, and copolymers thereof. Particularly preferred plastics comprise PET and PEN.

The PET which is suitable for practicing the present invention may be prepared from dicarboxylic acids including mainly terephthalic acid or ester-forming derivatives of such acids, and glycols including mainly ethylene glycol or ester-forming derivatives of such glycols, and is effected via esterification and polycondensation. Terephthalic acid or its ester-forming derivative is subjected to polycondensation with ethylene glycol or its ester-forming derivative. Alternatively, these components are subjected to co-polycondensation together with other dicarboxylic acids or ester-forming derivatives thereof and/or other glycols or ester-forming derivatives thereof.

As the dicarboxylic acids to be used in the co-polycondensation other than terephthalic acid, there may be, for example, aromatic dicarboxylic acids, such as, phthalic acid, isophthalic acid, naphthalenedicarboxylic acid, diphenyldicarboxylic acid, and dephenoxyethanedicarboxylic acid, aliphatic dicarboxylic acids, such as, adipic acid, sebacic acid, azelaic acid, and decanedicarboxylic acid, and alicyclic dicarboxylic acids, such as, cyclohexanedicarboxylic acid, and the like.

As the glycols to be used in the co-polycondensation according to the present invention other than ethylene glycol, there may be, for example, aliphatic glycols, such as, trimethylene glycol, propylene glycol, tetramethylene glycol, neopentyl glycol, hexamethylene glycol, and dodecanethylene glycol, alicyclic glycols, such as cyclohexane dimethanol etc., and aromatic diols, such as, bisphenols, hydroquinone, and 2,2-bis(4-.beta.-hydroxyethoxyphenyl) propane.

As the ester-forming derivatives of terephthalic acid and other dicarboxylic acids, there may be, for example, lower alkyl esters and phenyl esters of terephthalic acid and other dicarboxylic acids. As the ester-forming derivatives of ethylene glycol and other glycols, there may be, for example, monocarboxylic acid esters of ethylene glycol and other glycols.

Methods of producing PET by esterification and polycondensation are well-known to those ordinarily skilled in the art.

Other suitable plastics for practicing the invention include, but are not necessarily limited to, PEN and isomers thereof, including 2,6-, 1,4-, 1,5-, 2,7-, and 2,3-PEN. Also contemplated are copolymers of PEN such as, for example, copolymers of 2,6-, 1,4-, 1,5,2,7-, and/or 2,3-naphthalene dicarboxylic acid, or esters thereof, with (a) terephthalic acid, or esters thereof, (b) isophthalic acid, or esters thereof, (c) phthalic acid, or esters thereof, (d) alkane glycols, (e) cycloalkane glycols, (f) alkane dicarboxylic acids, and/or (g) cycloalkane dicarboxylic acids.

The infrared energy absorbing material may be any compound which selectively absorbs a specific wavelength of electromagnetic radiation, especially in the 800 to 2,500 nm range, and which does not interfere with the subsequent stretch blow molding of the plastic. This material may simply be a colorant such as, for example, colormatrix 89-413-2 which imparts an amber color to the plastic, or may be, for example, a latent acid or base. Some specific examples include, but are not limited to, diazonium salts, sulfonium salts (e.g., triphenylsulfonium bromide), sulfoxonium salts, iodonium salts, 0-nitrobenzaldhydes, compounds containing aromatically bound chlorine or bromine (e.g., hexafluorotetrabromo-bisphenol A), and the like.

EXAMPLE

A co-layer preform, comprising a clear outer preform made of PET and an amber,colormatrix 89-413-2 containing inner preform made of PEN, is produced by conventional methods. The co-layer preform is then heated by exposure to infrared energy, causing the inner preform to attain a higher temperature than the outer preform. The co-layer preform is thereafter stretch blow molded to form a dual walled plastic container. It is observed that the inner preform successfully stretches to conform to the inner surface of the formed outer preform during the stretch blow molding process.

The Example may be repeated with similar success by substituting the generically or specifically described materials or conditions recited herein for those set forth in the preceding Example.

Form the foregoing description, one ordinarily skilled in the art can easily ascertain the essential characteristics of the invention, and without departing from its spirit or scope, can make various changes and modifications to adapt the invention to various uses and conditions.

What is claimed is:

1. A co-layer stretch blow molding preform, comprising:
an outer plastic preform; and
an inner plastic preform, said inner plastic preform including an infrared energy absorbing material which is substantially absent from the outer plastic preform.

2. The co-layer stretch blow molding preform according to claim 1, wherein the inner plastic preform and outer plastic preform are prepared from PET, PEN, polystyrene, polyacrylates, polymethacrylates, polyvinyl chloride, polyacrylonitrile, polyvinyl acetate, polyvinyl alcohol, polyolefins, polyesters, polycarbonates, polyethers, polyamides, as well as derivatives, blends, and copolymers thereof.

3. The co-layer stretch blow molding preform according to claim 1, wherein the inner plastic preform and outer plastic preform are prepared from different plastics.

4. The co-layer stretch blow molding preform according to claim 1, wherein the inner plastic preform is prepared from PEN.

5. The co-layer stretch blow molding preform according to claim 1, wherein the outer plastic preform is prepared from PET.

6. The co-layer stretch blow molding preform according to claim 1, wherein the infrared energy absorbing material is a colorant.

7. A co-layer stretch blow molding preform, comprising:
an outer PET preform; and
an inner PEN preform, said inner PEN preform including an infrared energy absorbing colorant which is substantially absent from the outer PET preform.

* * * * *